United States Patent
Makita

(10) Patent No.: US 9,837,858 B2
(45) Date of Patent: Dec. 5, 2017

(54) POWER RECEPTION DEVICE AND ELECTRONIC APPARATUS

(71) Applicant: TOKIN CORPORATION, Sendai-shi, Miyagi (JP)

(72) Inventor: Kazumasa Makita, Sendai (JP)

(73) Assignee: TOKIN CORPORATION, Tokyo (JP)

( * ) Notice: Subject to any disclaimer, the term of this patent is extended or adjusted under 35 U.S.C. 154(b) by 488 days.

(21) Appl. No.: 14/371,141

(22) PCT Filed: Jun. 28, 2013

(86) PCT No.: PCT/JP2013/067784
§ 371 (c)(1),
(2) Date: Jul. 8, 2014

(87) PCT Pub. No.: WO2014/087692
PCT Pub. Date: Jun. 12, 2014

(65) Prior Publication Data
US 2015/0042170 A1    Feb. 12, 2015

(30) Foreign Application Priority Data
Dec. 6, 2012   (JP) .................................. 2012-266851

(51) Int. Cl.
*H02J 17/00* (2006.01)
*H04B 5/00* (2006.01)

(52) U.S. Cl.
CPC ............ *H02J 17/00* (2013.01); *H04B 5/0031* (2013.01); *H04B 5/0037* (2013.01)

(58) Field of Classification Search
CPC .................................. H02J 50/00; H02J 17/00
(Continued)

(56) References Cited

U.S. PATENT DOCUMENTS

| | | | | |
|---|---|---|---|---|
| 8,674,552 B2 * | 3/2014 | Shinoda | ................. | H02J 5/005 307/104 |
| 2011/0115303 A1 * | 5/2011 | Baarman | ................. | H02J 17/00 307/104 |

(Continued)

FOREIGN PATENT DOCUMENTS

| | | | | |
|---|---|---|---|---|
| JP | WO 2010035546 A1 * | 4/2010 | ............. | H02J 5/005 |
| JP | 2011134049 A | 7/2011 | | |

(Continued)

OTHER PUBLICATIONS

International Search Report (ISR) dated Oct. 1, 2013 issued in International Application No. PCT/JP2013/067784.

*Primary Examiner* — Daniel Kessie
(74) *Attorney, Agent, or Firm* — Holtz, Holtz & Volek PC

(57) ABSTRACT

A power reception device includes a power reception antenna, a rectifier circuit, a communication section, a switch and a switch control section. The rectifier circuit converts electric power received by the power reception antenna into direct current voltage. The communication section communicates via the power reception antenna. The switch is connected between the power reception antenna and the communication section. The switch can transition between a conductive state where the communication section is electrically connected to the power reception antenna and a cut-off state where the communication section is electrically disconnected from the power reception antenna. The switch control section performs transition of the switch into the cut-off state when the direct current voltage exceeds a first threshold. The switch control section performs transition of the switch into the conductive state when the direct current voltage falls below a second threshold different from the first threshold.

5 Claims, 4 Drawing Sheets

(58) Field of Classification Search
USPC .......................................................... 307/104
See application file for complete search history.

(56) References Cited

U.S. PATENT DOCUMENTS

2012/0235508 A1    9/2012   Ichikawa
2013/0270924 A1    10/2013  Mori et al.

FOREIGN PATENT DOCUMENTS

| JP | 2012039707 A  | 2/2012  |
| JP | 2012196031 A  | 10/2012 |
| WO | 2012090904 A1 | 7/2012  |

* cited by examiner

POWER RECEPTION DEVICE AND ELECTRONIC APPARATUS

TECHNICAL FIELD

This invention relates to a power reception device and an electronic apparatus each of which receives electric power in a non-contact manner.

BACKGROUND ART

In general, a system that transmits electric power in a non-contact manner is constituted of a power transmission device and a power reception device. The power transmission device comprises a control circuit and a power transmission antenna. The power transmission device, by using the control circuit and the power transmission antenna, communicates with the power reception device and transmits AC power to the power reception device. The control circuit controls a communication signal (hereafter, simply referred to as "signal") when the power transmission device communicates with the power reception device. Moreover, the control circuit controls electric power transmission of the power transmission device. The power reception device comprises a power reception antenna, a communication section, a rectifier circuit and a DC-DC converter. Moreover, the power reception device is connected with a load. The communication section of the power reception device processes the signal which is sent from the power transmission device. The rectifier circuit converts, into direct current voltage, the AC power received from the power transmission device, and the direct current voltage is output. The direct current voltage output from the rectifier circuit is supplied to the load via the DC-DC converter. The power transmission device and the power reception device communicates with each other when the electric power is transmitted as described above. The communication and the electric power transmission can be performed in a time sharing manner by using the pair of the power transmission antenna and the power reception antenna. In this case, the power reception device uses the single power reception antenna for both the communication and the electric power reception.

For example, Patent Document 1 discloses a power reception device which uses a single power reception antenna to communicate and to receive electric power.

The power reception device of Patent Document 1 comprises a secondary side antenna (power reception antenna), an RFID (communication section) including a first rectifier circuit, a second rectifier circuit, a functioning section (load) connected to the second rectifier circuit, and a bypass circuit. The first rectifier circuit and the second rectifier circuit are connected in series to the secondary side antenna. The bypass circuit is connected in parallel to the first rectifier circuit. The bypass circuit adjusts ratio between electric current flown in the first rectifier circuit and electric current flown in the second rectifier circuit. Accordingly, large electric power can be supplied to the functioning section without being limited because of endurable voltage of the RFID. In other words, even when the large electric power is supplied to the functioning section, the RFID can be protected.

PRIOR ART DOCUMENTS

Patent Document(s)

Patent Document 1: JP A 2011-134049

SUMMARY OF INVENTION

Technical Problem

In the power reception device of Patent Document 1, the communication section for performing communication and the rectifier circuit for supplying the electric power to the load are connected in series. However, in some cases where a power reception device uses a single power reception antenna for both communication and electric power reception, a communication section and a rectifier circuit are connected to a power reception antenna in parallel to each other. Similar to the Patent Document 1, the thus-configured power reception antenna might receive electric power over endurable voltage of the communication section. Accordingly, the communication section needs to be protected by a method different from that of Patent Document 1. Specifically, when the power reception device receives the electric power, the communication section needs to be electrically disconnected. In contrast, when the power reception device does not receive the electric power, the communication section needs to be communicatable.

The rectifier circuit outputs direct current voltage not only during the electric power reception but also during the communication. In general, the output voltage of the rectifier circuit during the electric power reception is higher than the output voltage during the communication. Accordingly, in many cases, it can be determined, by using the output voltage of the rectifier circuit, whether the power reception device is in the middle of receiving the electric power or not. However, in some cases, the output voltage of the rectifier circuit during the electric power reception and the output voltage during the communication are almost same as each other. For example, in some cases, difference between the output voltage during the electric power reception and the output voltage during the communication is equal to or less than 1V. Moreover, in some cases, the output voltage of the rectifier circuit during the communication becomes higher than the output voltage during the electric power reception. In such cases, it is difficult to determine, by using the level of the output voltage of the rectifier circuit, whether the power reception device is in the middle of receiving the electric power or not.

It is therefore an object of the present invention to provide a power reception device, wherein it can be determined whether the power reception device is in the middle of receiving the electric power or not even if the output voltage of the rectifier circuit during the communication is same as or larger than the output voltage during the electric power reception.

Solution to Problem

An aspect (first aspect) of the present invention provides a power reception device comprising a power reception antenna, a rectifier circuit, a communication section, a switch and a switch control section. The power reception antenna is used for both communication and electric power reception. The rectifier circuit is connected to the power reception antenna. The rectifier circuit converts, into direct current voltage, electric power received by the power reception antenna, and the direct current voltage is output and supplied to a load. The communication section communicates via the power reception antenna. The switch is connected between the power reception antenna and the communication section. The switch is transitable between a conductive state where the communication section is electrically connected to the power reception antenna and a cut-off state where the communication section is electrically disconnected from the power reception antenna. The switch control section is connected to the rectifier circuit. The switch control section performs transition of the switch into the cut-off state when the direct current voltage output from the rectifier circuit exceeds a first threshold in association with start of the electric power reception by the power reception antenna. Moreover, the switch control section performs transition of the switch into the conductive state when the direct current voltage falls below a second threshold different from the first threshold.

Another aspect (second aspect) of the present invention provides an electronic apparatus comprising the power reception device according to the first aspect and a load. To the load, the direct current voltage output from the rectifier circuit of the power reception device is supplied.

Advantageous Effects of Invention

According to the present invention, when the direct current voltage output from the rectifier circuit exceeds the first threshold, the communication section is disconnected so that the electric power over endurable voltage of the communication section is receivable. Moreover, when the direct current voltage falls below the second threshold different from the first threshold, the communication section is electrically connected to be communicatable. Thus, by using the first threshold and the second threshold, it can be determined whether the power reception device is in the middle of receiving the electric power or not. Accordingly, even if the output voltage of the rectifier circuit during the communication is same as or larger than the output voltage during the electric power reception, it can be determined, by properly setting the first threshold and the second threshold, whether the power reception device is in the middle of receiving the electric power or not.

An appreciation of the objectives of the present invention and a more complete understanding of its structure may be had by studying the following description of the preferred embodiment and by referring to the accompanying drawings.

DESCRIPTION OF EMBODIMENTS

Figures 1, 2:
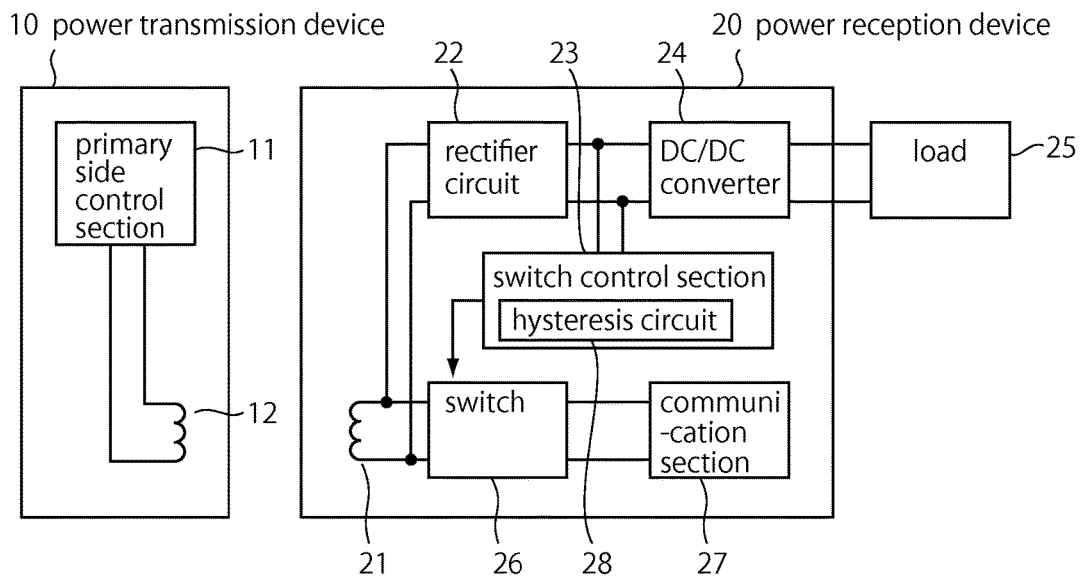
FIG. 1 is a block diagram showing a power reception device according to an embodiment of the present invention and a power transmission device which is an opposite side device to the power reception device.
FIG. 2 is a circuit diagram showing a switch of the power reception device of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

As can be seen from FIG. 1, the power reception device 20 according to the present embodiment is communicatable with a power transmission device 10 and is receivable electric power from the power transmission device 10.

The power transmission device 10 according to the present embodiment comprises a primary side control section 11 and a power transmission antenna 12. The power transmission device 10, by using the power transmission antenna 12, communicates with the power reception device 20 and transmits the electric power to the power reception device 20.

The power reception device 20 comprises a power reception antenna 21, a rectifier circuit 22, a switch control section 23, a DC-DC converter 24, a switch 26 and a communication section 27. The power reception device 20 according to the present embodiment is connected with a load 25 external of the power reception device 20. In other words, the power reception device 20 is installed in an electric apparatus (not shown) which comprises the load 25. However, the power reception device 20 may comprise the load 25 as one of its components.

The power reception device 20, by using the power reception antenna 21, communicates with the power transmission device 10 and receives the electric power from the power transmission device 10. In other words, the power reception device 20 can be in at least two states, namely, a communication state where communication with the power reception device 20 is performed and a power reception state where electric power reception from the power transmission device 10 is performed. Moreover, the power reception device 20 can be in a standby state which is not any one of the communication state and the power reception state.

The power reception antenna 21 according to the present embodiment is used for both the communication and the electric power reception. In detail, the power reception antenna 21 is connected with the communication section 27 via the switch 26. The power reception antenna 21 transmits a signal, which is received from the power transmission antenna 12, to the communication section 27, and the power reception antenna 21 sends a signal, which is transmitted from the communication section 27, to the power transmission antenna 12. In other words, the communication section 27 communicates with the primary side control section 11 via the power reception antenna 21 and the power transmission antenna 12. The power reception antenna 21 is also connected to the rectifier circuit 22. The power reception antenna 21 receives, by magnetic coupling with the power transmission antenna 12, the electric power transmitted from the power transmission device 10 as alternating current power, and the alternating current power is supplied to the rectifier circuit 22.

The rectifier circuit 22 is connected to the DC-DC converter 24. The rectifier circuit 22 rectifies, or converts, the alternating current power supplied from the power reception antenna 21 into direct current voltage, the direct current voltage is output, and the output direct current voltage is supplied to the DC-DC converter 24.

The DC-DC converter 24 is connected between the rectifier circuit 22 and the load 25. The DC-DC converter 24 converts voltage level of the direct current voltage supplied from the rectifier circuit 22, and the direct current voltage after conversion is supplied to the load 25. In other words, the direct current voltage output from the rectifier circuit 22 is supplied to the load 25 via the DC-DC converter 24.

The switch 26 is connected to the power reception antenna 21 in parallel to the rectifier circuit 22. In detail, the switch 26 is connected between the power reception antenna 21 and the communication section 27. The switch 26 is configured to be transitable between two states, namely, a conductive state and a cut-off state. When the switch 26 is in the conductive state, the communication section 27 is electrically connected to the power reception antenna 21. Accordingly, when the switch 26 is in the conductive state, the communication section 27 is communicatable with the power transmission device 10 (the primary side control section 11). On the other hand, when the switch 26 is in the cut-off state, the communication section 27 is electrically disconnected from the power reception antenna 21. Accordingly, when the switch 26 is in the cut-off state, the communication section 27 is protected from over voltage even if the over voltage is generated between the power reception antenna 21 and the rectifier circuit 22 under the power reception state.

The switch control section 23 is connected to the rectifier circuit 22 in parallel to the DC-DC converter 24. The switch control section 23 includes a hysteresis circuit 28. The switch control section 23, by using the hysteresis circuit 28, controls the switch 26 in accordance with output voltage, or the voltage level of the direct current voltage output from the rectifier circuit 22. In detail, the hysteresis circuit 28 of the switch control section 23 performs transition of the switch 26 into the conductive state from the cut-off state when fluctuation of the output voltage satisfies a predetermined condition and performs transition of the switch 26 into the cut-off state from the conductive state when the fluctuation of the output voltage satisfies another predetermined condition.

Hereafter, explanation is made about an action of the power reception device 20 according to a present embodiment.

When the power reception device 20 (the communication section 27) is placed within a region where the communication with the power transmission device 10 (the primary side control section 11) is possible, authentication with identifier (ID) is performed between the primary side control section 11 and the communication section 27. At that time, the switch control section 23 makes the switch 26 be in the conductive state. Moreover, the power reception device 20 is in the communication state.

When the authentication is successful, the primary side control section 11 starts electric power transmission to the power reception device 20. The transmitted electric power is received by the power reception antenna 21 and is rectified by the rectifier circuit 22. In the meantime, as described below, the switch control section 23 controls the switch 26 in accordance with the output voltage of the rectifier circuit 22.

The DC-DC converter 24 is inactive to have high input impedance before the power reception antenna 21 starts the electric power reception. Accordingly, from immediately after the start of the electric power reception to activation of the DC-DC converter 24, the output voltage of the rectifier circuit 22 is temporally raised. When the output voltage of the rectifier circuit 22 is raised to exceed a first threshold, the switch control section 23 (the hysteresis circuit 28) performs transition of the switch 26 into the cut-off state. In other words, when the output voltage of the rectifier circuit 22 reaches the first threshold, the switch control section 23 (the hysteresis circuit 28) detects the transition of the power reception device 20 from the communication state into the power reception state to perform the transition of the switch 26 into the cut-off state. Accordingly, the communication section 27 is electrically disconnected from the power reception antenna 21 to be protected. As can be seen from the above explanation, the DC-DC converter 24 according to the present embodiment is inactive from when the power reception antenna 21 starts the electric power reception until the output voltage of the rectifier circuit 22 reaches the first threshold. According to the present embodiment, since the thus-configured DC-DC converter 24 is provided, the communication section 27 can be protected more securely.

When the DC-DC converter 24 is activated, the input impedance of the DC-DC converter 24 is lowered. Accordingly, the temporally raised output voltage of the rectifier circuit 22 is also lowered. The lowered output voltage is supplied to the load 25 via the DC-DC converter 24.

As described above, when the power reception antenna 21 starts the electric power reception, the output voltage of the rectifier circuit 22 reaches, through a maximum value, a supplied value smaller than the maximum value. The output voltage, which reaches the supplied value, is supplied to the load 25 via the DC-DC converter 24. As can be seen from the above explanation, the first threshold may be set to be larger than the aforementioned supplied value and smaller than the maximum value.

The primary side control section 11 stops the electric power transmission after transmitting the electric power by a predetermined period of time. Subsequently, the output voltage of the rectifier circuit 22 is lowered to a ground level from the supplied value. When the output voltage of the rectifier circuit 22 is lowered to fall below a second threshold, or to reach the second threshold different from the first threshold, the switch control section 23 (the hysteresis circuit 28) detects the transition of the power reception device 20 from the power reception state into the standby state to perform the transition of the switch 26 into the conductive state. For example, the second threshold may be a value equal to or less than 90% of the supplied value, or the output voltage of the rectifier circuit 22 under the state where the DC-DC converter 24 is active. In other words, the second threshold may be set to be smaller than the supplied value.

As described above, the switch control section 23 detects the output voltage of the rectifier circuit 22. The switch control section 23 performs the transition of the switch 26 into the cut-off state, or cuts off the switch 26, when the detected output voltage is larger than the first threshold so that the power reception device 20 can receive the electric power while protecting the communication section 27. Moreover, when the detected output voltage is smaller than the second threshold, the switch control section 23 detects end of the electric power reception to perform the transition of the switch 26 into the conductive state, or to make the switch 26 conductive, to cancel the protection of the communication section 27. Accordingly, even if the output voltage of the rectifier circuit 22 under the communication state is same as or larger than the output voltage (supplied value) under the power reception state, the switch 26 can be properly transited between the conductive state and the cut-off state by hysteresis control which uses the first threshold and the second threshold.

Hereafter, explanation is made about a specific circuit structure of the switch 26 according to the present embodiment.

As shown in FIG. 2, the switch 26 according to the present embodiment includes two in-line switches 52, two ground switches 54 and two input protection sections 55.

The two in-line switches 52 are provided on two lines 59, respectively, wherein the lines 59 connect the power reception antenna 21 to the communication section 27. In other words, the in-line switch 52 is connected in series between the power reception antenna 21 and the communication section 27. The in-line switch 52 is formed of an N-channel FET. The drain (D) of the FET that constitutes the in-line switch 52 is connected to an end of a coil of the power reception antenna 21, the source (S) is connected to the communication section 27, and the gate (G) is connected to the switch control section 23.

Each of the two ground switches 54 is provided between the line 59 and the ground. In detail, each of the ground switches 54 is connected between a connection point and the ground, wherein the connection point is between the in-line switch 52 and the communication section 27. Similar to the in-line switch 52, the ground switch 54 is formed of an N-channel FET. The drain (D) of the FET that constitutes the ground switch 54 is connected to the corresponding line 59, the source (S) is connected to the ground, and the gate (G) is connected to the switch control section 23.

Each of the two input protection sections 55 is connected to the line 59 in parallel to the ground switch 54. In other words, the input protection sections 55 are provided between the respective two lines 59 and the ground. Each of the input protection sections 55 is formed of a single zener diode (ZD). The cathode of the zener diode (ZD) is connected to the corresponding line 59, and the anode is connected to the ground.

Because the switch 26 according to the present embodiment is configured as described above, the switch 26 is transited into the conductive state when the switch control section 23 makes the in-line switches 52 be conductive while cutting off the ground switches 54. The switch 26 transited into the conductive state electrically connects the power reception antenna 21 with the communication section 27. Moreover, the switch 26 is transited into the cut-off state when the switch control section 23 cuts off the in-line switches 52 while making the ground switches 54 be conductive. A connection part with the communication section 27 is short-circuited to the ground level by the switch 26 transited into the cut-off state so that the communication section 27 is securely cut off from the power reception antenna 21.

Moreover, since the switch 26 includes the input protection sections 55, an input voltage to the communication section 27 is prevented from becoming larger than a predetermined value even when the switch 26 is transited into the cut-off state from the conductive state. In other words, the switch 26 (the input protection section 55) has an input protection function which protects the communication section 27.

The switch 26 may have a structure different from the aforementioned structure, provided that the control of the switch control section 23 can make the power reception antenna 21 be conductive with and be cut off from the communication section 27. Hereafter, explanation is made about various modifications of the switch 26.

Figure 3:
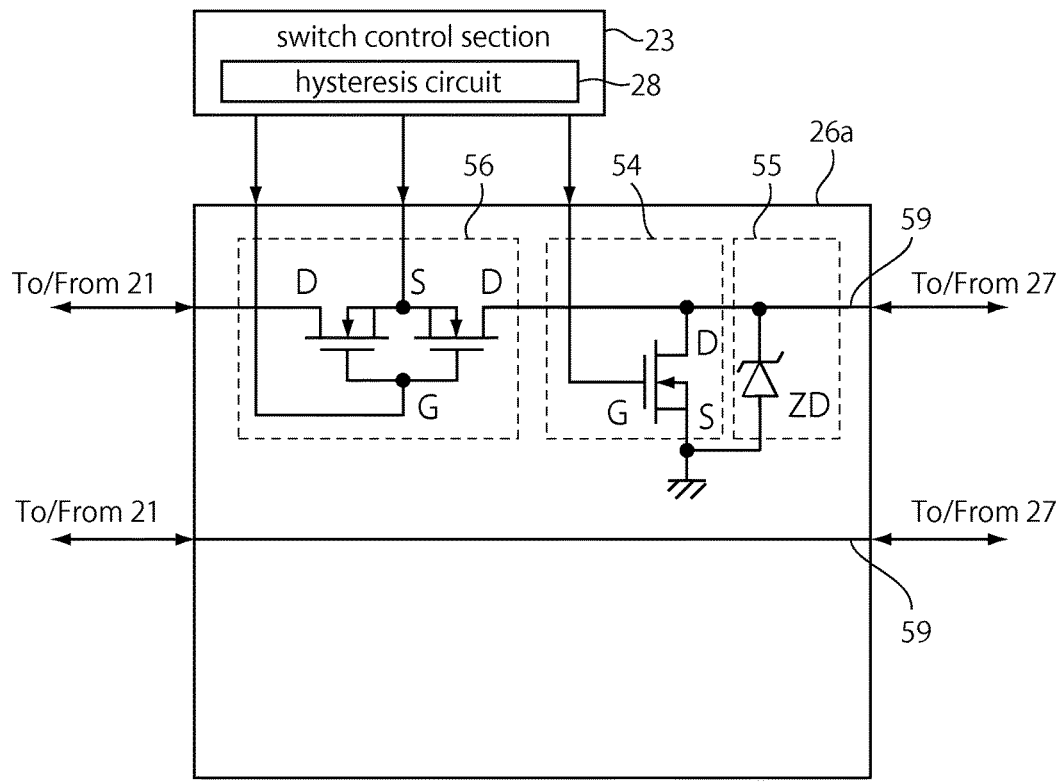
FIG. 3 is a circuit diagram showing a first modification of the switch of FIG. 2.

As can be seen from FIG. 3, a switch 26a according to a first modification of the switch 26 (see FIG. 2) includes a single bidirectional switch 56, the single ground switch 54 and the single input protection section 55. When the bidirectional switch 56 is provided instead of the in-line switches 52 (see FIG. 2), the bidirectional switch 56, the ground switch 54 and the input protection section 55 may be provided on only one of the two lines 59.

Because the switch 26a according to the first modification is configured as described above, the switch 26a is transited into the conductive state when the switch control section 23 makes the bidirectional switch 56 be conductive while cutting off the ground switch 54. Moreover, the switch 26a is transited into the cut-off state when the switch control section 23 cuts off the bidirectional switch 56 while making the ground switch 54 be conductive. Moreover, similar to the switch 26, the switch 26a has the input protection function that protects the communication section 27.

Figure 4:
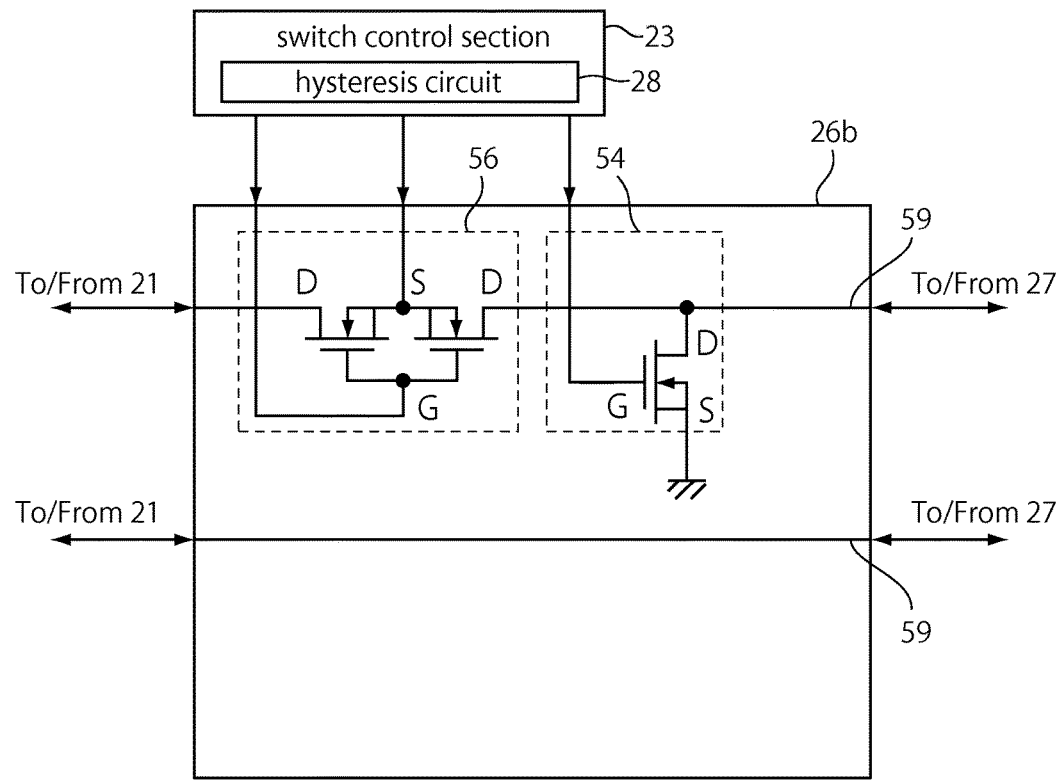
FIG. 4 is a circuit diagram showing a second modification of the switch of FIG. 2.

As can be seen from FIG. 4, a switch 26b according to a second modification of the switch 26 (see FIG. 2) includes the single bidirectional switch 56 and the single ground switch 54. In other words, the switch 26b is configured similar to the switch 26a (see FIG. 3) except not provided with the input protection section 55 (the zener diode (ZD)). The switch 26b according to the second modification functions similar to the switch 26a except not having the input protection function.

Figure 5:
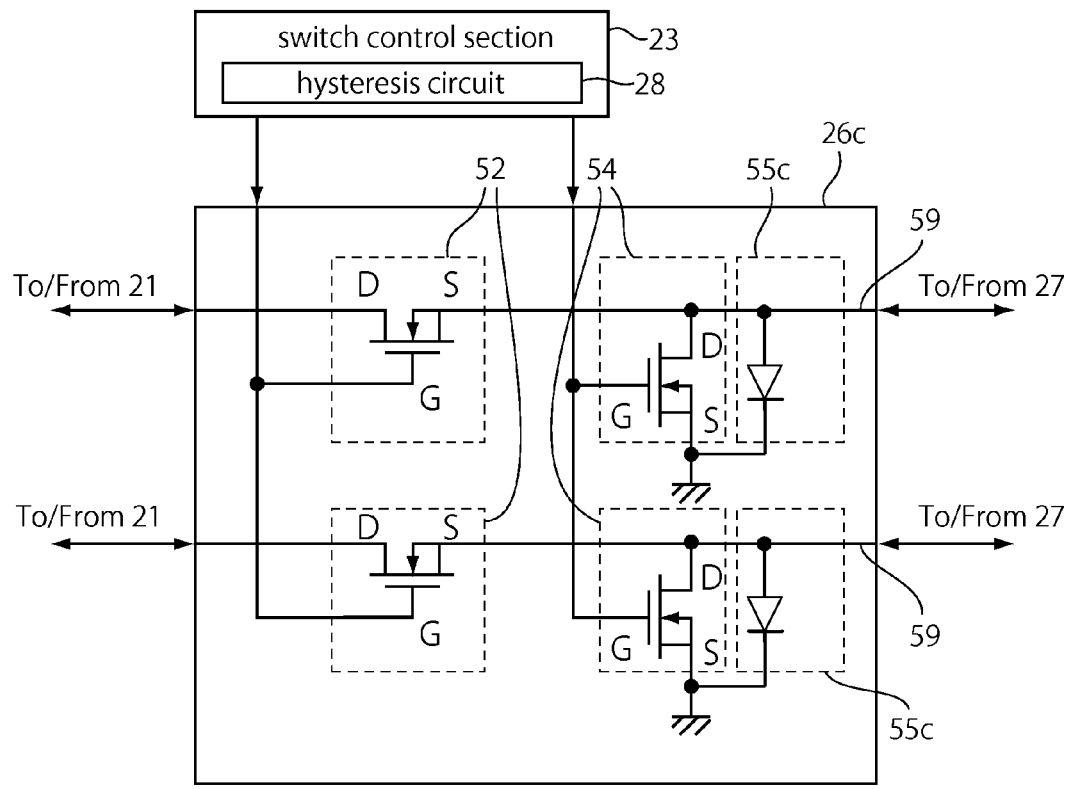
FIG. 5 is a circuit diagram showing a third modification of the switch of FIG. 2.

As can be seen from FIG. 5, a switch 26c according to a third modification of the switch 26 (see FIG. 2) is configured similar to the switch 26 (see FIG. 2) except including two input protection sections 55c instead of the two input protection sections 55. Each of the input protection sections 55c is connected to the line 59 in parallel to the ground switch 54. In detail, each of the input protection sections 55c is formed of a single diode. The anode of the diode is connected to the corresponding line 59, and the cathode is connected to the ground. Accordingly, when the line 59 is applied with a voltage equal to or more than the forward voltage (VF) of the diode, the diode becomes conductive so that the communication section 27 is protected. As can be seen from the above explanation, the input protection function can be provided by using a component other than the zener diode (ZD).

Figure 6:
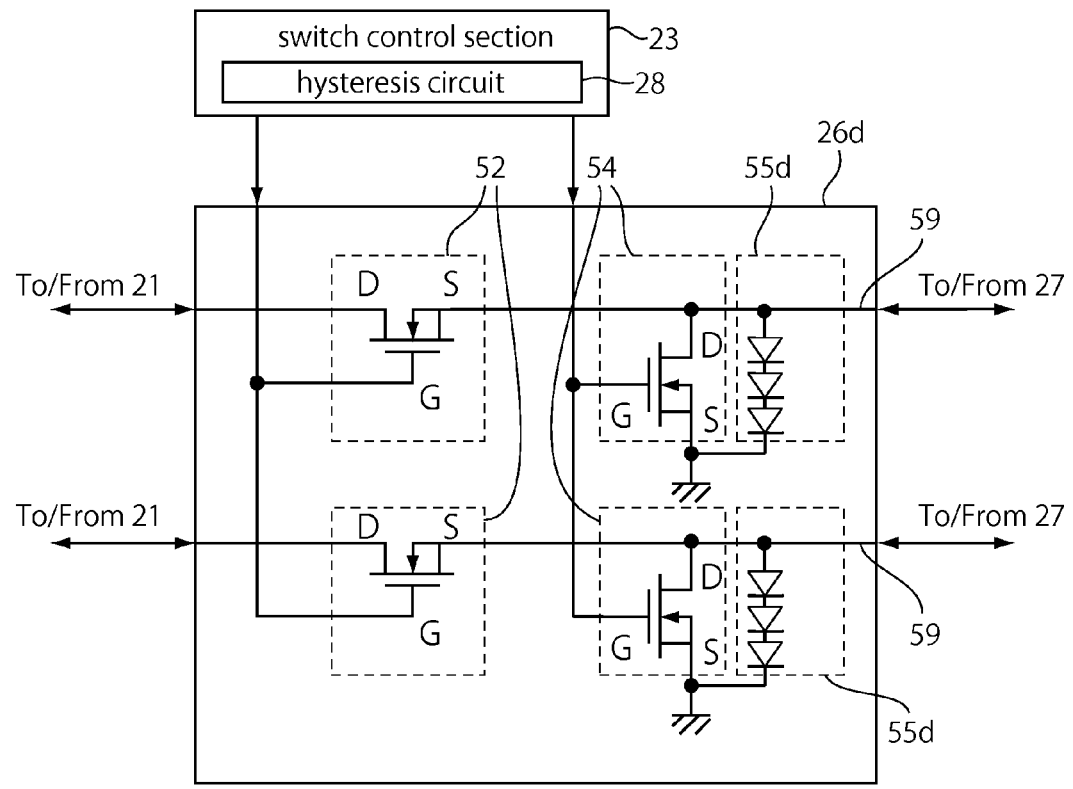
FIG. 6 is a circuit diagram showing a fourth modification of the switch of FIG. 2.

As can be seen from FIG. 6, a switch 26d according to a fourth modification of the switch 26 (see FIG. 2) is configured similar to the switch 26c (see FIG. 5) except including two input protection sections 55d each of which is a little different from the input protection section 55c. More specifically, each of the input protection sections 55d is formed of a plurality diodes which are connected in series. Accordingly, two of the diodes are located opposite ends of the input protection section 55d, respectively. The anode of the diode located at one of the ends of the input protection section 55d is connected to the line 59. Furthermore, the cathode of the diode located at a remaining one of the ends of the input protection section 55d is connected to the ground.

Since the input protection section 55d is formed of the plurality of the same diodes, operating voltage of the input protection section 55d is equal to voltage calculated by multiplying the forward voltage (VF) of the diode by the number of the diodes (series number). The input protection section 55d may be formed of a plurality of diodes which are different from one another. In this case, the operating voltage of the input protection section 55d is equal to voltage calculated by adding up the forward voltage (VF) of each diode. According to the present modification, since the input protection section 55d is formed of the plurality of the diodes, the operating voltage of the input protection section 55d can be set more properly. When the line 59 is applied with voltage equal to or more than the operation voltage which is set as described above, electric current flows through the input protection section 55*d* so that the communication section 27 is protected.

The power reception device 20 according to the present embodiment can be modified variously in addition to the aforementioned modifications.

Figure 7:
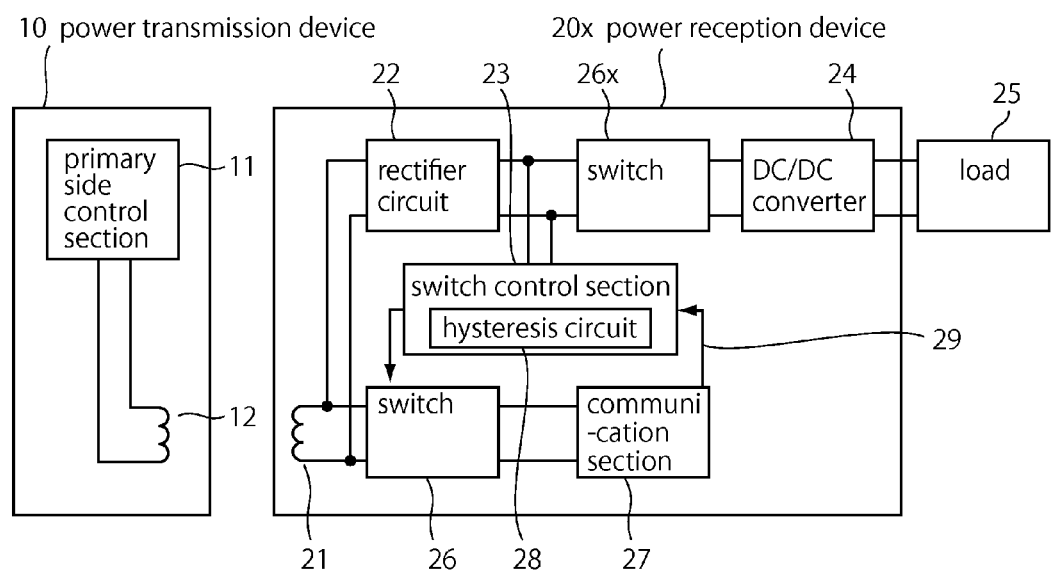
FIG. 7 is a block diagram showing a power reception device according to a modification of the embodiment of the present invention and the power transmission device.

As shown in FIG. 7, a power reception device 20*x* according to a modification of the present embodiment is configured almost same as, but a little differently from, the power reception device 20 (see FIG. 1). More specifically, the power reception device 20*x* is configured same as the power reception device 20 except comprising a switch 26*x* and a control signal path 29 which are not included in the power reception device 20. The switch 26*x* is provided between the rectifier circuit 22 and the DC-DC converter 24. The control signal path 29 is a path for the communication section 27 to transmit a control signal to the switch control section 23.

As described below, the switch control section 23 of the power reception device 20*x* according to the present modification performs control which is a little different from that of the switch control section 23 of the power reception device 20 (see FIG. 1).

In some cases, the power reception device 20*x* performs communication originated from the power reception device 20*x* such as communication with another IC card or IC tag. In these cases, the power reception device 20*x* functions like a reader/writer while the power transmission device 10 functions like a communication partner such as the IC card or the IC tag.

In the aforementioned case where the communication is performed from the power reception device 20*x* to the power transmission device 10, a communication signal (signal) is sent from the power reception antenna 21. In general, a reception voltage value, or the output voltage of the rectifier circuit 22 generated during signal receiving of the power reception antenna 21, is smaller than the supplied value, or the output voltage of the rectifier circuit 22 under the power reception state. Accordingly, the reception voltage value does not exceed the first threshold. However, the output voltage of the rectifier circuit 22 generated during the signal sending from the power reception antenna 21 might exceed the first threshold.

According to the present embodiment, if the output voltage of the rectifier circuit 22 exceeds the first threshold during the signal sending from the power reception device 20*x* to the power transmission device 10, the switch 26 is cut off. As a result, the signal cannot be sent from the power reception antenna 21.

Accordingly, the switch control section 23 (the hysteresis circuit 28) of the power reception device 20*x* according to the present modification controls the switch 26 by using a third threshold in addition to the first threshold and the second threshold. In detail, the communication section 27 transmits the control signal to the switch control section 23 via the control signal path 29 only when the signal is sent from the power reception device 20*x* to the power transmission device 10. In other words, the communication section 27, by using the control signal, notifies the switch control section 23 that the signal sending via the power reception antenna 21 is performed. The switch control section 23 controls the switch 26 by using the third threshold instead of the first threshold when the control signal is received from the communication section 27. More specifically, under a case where the control signal is not received from the communication section 27, the switch control section 23 according to the modification, similar to the present embodiment, performs the transition of the switch 26 into the cut-off state when the output voltage of the rectifier circuit 22 exceeds the first threshold. On the other hand, under another case where the control signal is received from the communication section 27, the switch control section 23 according to the modification does not perform the transition of the switch 26 into the cut-off state even when the output voltage of the rectifier circuit 22 exceeds the first threshold, and the switch control section 23 performs the transition of the switch 26 into the cut-off state when the output voltage exceeds the third threshold larger than the first threshold.

The third threshold may be a value between the maximum value of the endurable voltage of the communication section 27 and the maximum value of the output voltage of the rectifier circuit 22 during the signal sending from the power reception device 20*x* to the power transmission device 10. Since the switch control section 23 controls the switch 26 by using the thus-set third threshold, the switch 26 can be prevented from being cut off during the signal sending from the power reception device 20*x* to the power transmission device 10.

Moreover, as described below, the power reception device 20*x* according to the present modification has various functions which use the switch 26*x*.

As previously described, even when the power reception device 20*x* and the power transmission device 10 communicate with each other, the rectifier circuit 22 generates the output voltage. The generated output voltage is supplied to the load 25 via the DC-DC converter 24. Thus, a part of the electric power for sending or receiving the signal is consumed by the load 25. As a result, sufficient level for the communication signal might not be obtained.

As can be seen from FIG. 7, according to the present modification, it is possible to cut off the switch 26*x* only when the power reception device 20*x* is in the communication state. Accordingly, the electric power for sending or receiving the signal can be prevented from being consumed by the load 25.

Moreover according to the present modification, by opening and closing the switch 26*x* under the power reception state, the electric power supplied to the load 25 can be modulated. Thus, during the electric power reception by the power reception antenna 21, communication with load modulation can be performed by using the power reception antenna 21. Under a case where the power reception device 20*x* functions, for example, like an IC card and performs the aforementioned communication with load modulation, the switch control section 23 may control the switch 26 by using the first threshold. In contrast, under another case where the power reception device 20*x* functions, for example, like a reader/writer for the IC card and where the communication section 27 send the signal, the switch control section 23 may control the switch 26 by using the third threshold instead of the first threshold.

Moreover, as described below, the communication section 27 can be protected more securely by the switch 26*x*. As previously described, each of the power reception device 20 according to the present embodiment and the power reception device 20*x* according to the modification comprises the DC-DC converter 24 (see FIGS. 1 and 7). Moreover, from when the power reception antenna 21 starts the electric power reception until the output voltage of the rectifier circuit 22 reaches the first threshold, the DC-DC converter 24 keeps the high input impedance since the DC-DC converter 24 is inactive. However, in some cases, it is difficult to provide the thus-configured DC-DC converter 24. Moreover, in some cases, the DC-DC converter 24 might become active before the output voltage of the rectifier circuit 22 reaches the first threshold. In these cases, the high input impedance can be intentionally obtained by the switch 26*x*. Specifically, from when the power reception antenna 21 starts the electric power reception until the output voltage of the rectifier circuit 22 reaches the first threshold, the switch 26*x* may be cut off. Moreover, when the output voltage of the rectifier circuit 22 exceeds the first threshold, the switch 26*x* may be made conductive. By being configured as described above, the communication section 27 can be protected more securely. Moreover, even if the DC-DC converter 24 is not provided, the communication section 27 can be protected.

INDUSTRIAL APPLICABILITY

The present invention is applicable to an electronic apparatus such as a portable telephone and a digital camera each having a structure for non-contact power charge. Moreover, the present invention is applicable to a system comprising the electronic apparatus.

The present application is based on a Japanese patent application of JP2012-266851 filed before the Japan Patent Office on Dec. 6, 2012, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

REFERENCE SIGNS LIST

10 power transmission device
11 primary side control section
12 power transmission antenna
20, 20*x* power reception device
21 power reception antenna
22 rectifier circuit
23 switch control section
24 DC-DC converter
25 load
26, 26*a*, 26*b*, 26*c*, 26*d*, 26*x* switch
27 communication section
28 hysteresis circuit
29 control signal path
52 in-line switch
54 ground switch
55, 55*c*, 55*d* input protection section
56 bidirectional switch
59 line
D drain
G gate
S source
ZD zener diode

The invention claimed is:

1. A power reception device comprising:
a power reception antenna used for both communication and electric power reception;
a rectifier circuit connected to the power reception antenna, wherein the rectifier circuit converts, into direct current voltage, electric power received by the power reception antenna, and the direct current voltage is output;
a communication section which communicates via the power reception antenna;
a switch circuit connected between the power reception antenna and the communication section, wherein the switch circuit is transitable between a conductive state in which the communication section is electrically connected to the power reception antenna and a cut-off state in which the communication section is electrically disconnected from the power reception antenna; and
a switch control section connected to the rectifier circuit, wherein the switch control section performs transition of the switch circuit into the cut-off state when the direct current voltage output from the rectifier circuit exceeds a first threshold in association with start of the electric power reception by the power reception antenna, and the switch control section performs transition of the switch circuit into the conductive state when the direct current voltage falls below a second threshold different from the first threshold,
wherein the power reception device is configured such that when the power reception antenna starts the electric power reception, the direct current voltage output from the rectifier circuit rises to reach a maximum value of voltage output from the rectifier circuit, at which the direct current voltage output from the rectifier circuit is not supplied to a load, and subsequently lowers to a supplied value of voltage output from the rectifier circuit, which is smaller than the maximum value and at which the direct current voltage output from the rectifier circuit is supplied to the load, and
wherein:
the first threshold is larger than the supplied value and smaller than the maximum value;
the switch circuit includes an in-line switch and a ground switch;
the in-line switch is connected in series between the power reception antenna and the communication section; and
the ground switch is connected between a connection point, which is between the power reception antenna and the communication section, and ground.

2. The power reception device as recited in claim 1, wherein the second threshold is smaller than the supplied value.

3. The power reception device as recited in claim 1, wherein the power reception device further comprises a DC-DC converter connected between the rectifier circuit and the load.

4. The power reception device as recited in claim 1, wherein each of the in-line switch and the ground switch is formed of an N-channel FET.

5. An electronic apparatus comprising:
a load;
a power reception antenna used for both communication and electric power reception;
a rectifier circuit connected to the power reception antenna, wherein the rectifier circuit converts, into direct current voltage, electric power received by the power reception antenna, and the direct current voltage is output;
a communication section which communicates via the power reception antenna;
a switch circuit connected between the power reception antenna and the communication section, wherein the switch circuit is transitable between a conductive state in which the communication section is electrically connected to the power reception antenna and a cut-off state in which the communication section is electrically disconnected from the power reception antenna; and a switch control section connected to the rectifier circuit, wherein the switch control section performs transition of the switch circuit into the cut-off state when the direct current voltage output from the rectifier circuit exceeds a first threshold in association with start of the electric power reception by the power reception antenna, and the switch control section performs transition of the switch circuit into the conductive state when the direct current voltage falls below a second threshold different from the first threshold, wherein the electronic apparatus is configured such that when the power reception antenna starts the electric power reception, the direct current voltage output from the rectifier circuit rises to reach a maximum value of voltage output from the rectifier circuit, at which the direct current voltage output from the rectifier circuit is not supplied to the load, and subsequently lowers to a supplied value of voltage output from the rectifier circuit, which is smaller than the maximum value and at which the direct current voltage output from the rectifier circuit is supplied to the load, and wherein:

the first threshold is larger than the supplied value and smaller than the maximum value;

the switch circuit includes an in-line switch and a ground switch;

the in-line switch is connected in series between the power reception antenna and the communication section; and the ground switch is connected between a connection point, which is between the power reception antenna and the communication section, and ground.

* * * * *